INVENTOR.
ALAN W. CHURCHILL
ROSCOE C. VAN CAMP
BY
Frederick Breitenfeld
ATTORNEY Patented Jan. 6, 1953

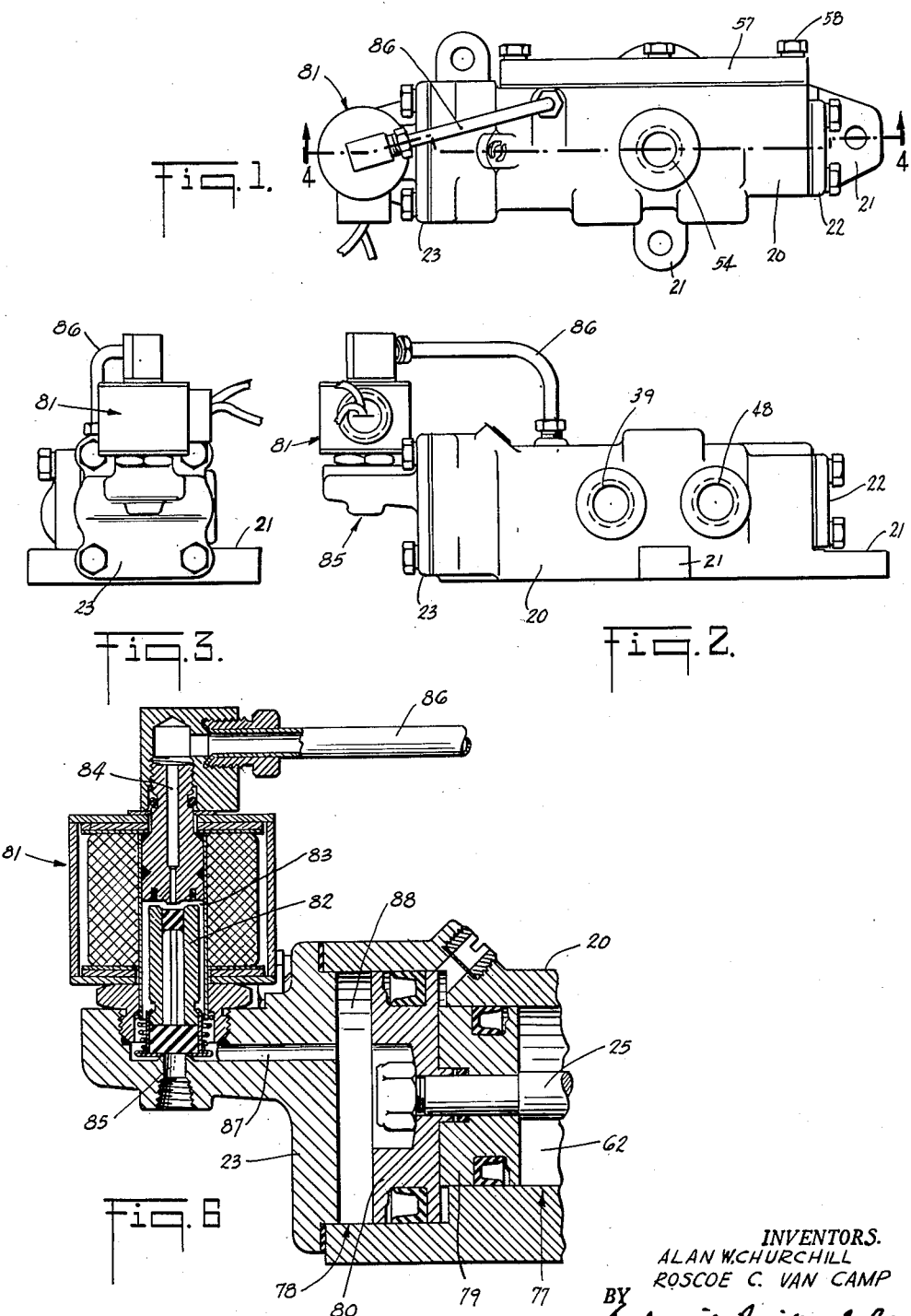

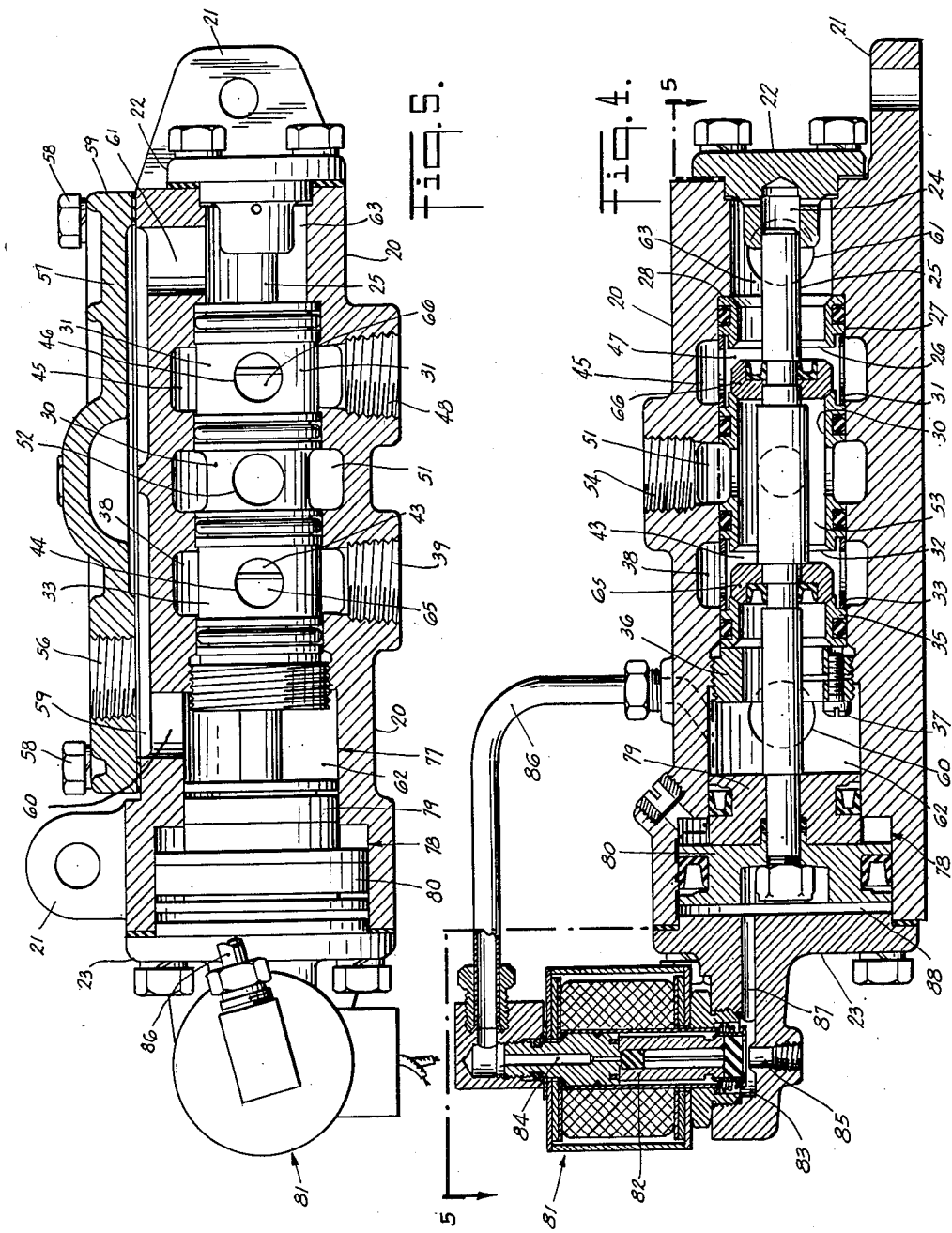

2,624,585

UNITED STATES PATENT OFFICE 2,624,585

FOUR-WAY VALVE

Alan W. Churchill, Caldwell, and Roscoe C. Van Camp, Madison, N. J., assignors to Automatic Switch Co., Orange, N. J., a corporation of New York Application February 19, 1951, Serial No. 211,728

4 Claims. (Cl. 277—12)

Our present invention relates generally to valves and has particular reference to four-way valves employing poppet-type valve elements and valve seats.

It is a general object of the invention to provide a four-way valve of improved design, actuated in a unique manner by a differential piston, and simultaneously affording in a single compact unit the advantages of poppet-valve operation and of single-axis tandem arrangement of valve seats.

Four-way valves have a variety of uses in industry. For example, such a valve is commonly used to connect two chambers alternately to a source of high pressure fluid and to an exhaust. Two such chambers are those on the opposite sides of a piston in a hydraulic or pneumatic cylinder. In such an installation, the function of the four-way valve would be to control the actuation of the piston, which in turn would control or actuate something which is to be reciprocated, e. g., a gate valve, a molding press, a clamp or the like.

A four-way valve consists essentially of two pairs of valve ports, and of a means for simultaneously opening or closing one port of each pair. It is well-known to arrange the pairs of valve ports side by side, as shown for example in United States Patent 2,218,861. This facilitates the use of poppet-type valve elements and valve seats, whose advantages are numerous as compared with sleeve-type valves. Yet the sleeve-type valves are advantageous from the standpoint of simplicity, compactness and speed of operation. It is a primary object of our invention to provide a four-way valve in which the advantages of poppet-type valves are retained in a single-axis assemblage of parts whose operation has the economy, speed, and other advantages heretofore inherent in sleeve-type valves.

Briefly stated, we achieve this result by arranging the valve seats in alignment along a single axis, and providing a valve element between the valve seats of each pair. Each valve element is constructed to define oppositely facing poppet-valves, and the valve elements are mounted on a common valve stem which reciprocates. During one stroke it seats the valve elements on the valve seats which face in one direction, and during the opposite stroke it seats the valve elements on the valve seats facing in the other direction.

In accordance with our invention, special provision is made for mounting the valve elements on the valve stem to allow for a limited relative movement of the valve elements toward and away from each other independent of valve stem movements. This relative movability allows independent seating of the valves during each stroke of the valve stem, thus assuring firm and reliable valve seating which is unaffected by temperature variations, which does not necessitate valve elements or valve seats of yieldable character, and which does not require manufacturing accuracy beyond the range of ordinary commercial tolerances.

The common valve stem of the structure is reciprocated by fluid pressures effective upon the opposite faces of a specially designed differential piston to which the valve stem is secured. The pressures used are those which are available for the actuation of the ultimate member or thing whose reciprocation is to be effected. As a result of the employment of a differential piston, and of other features of the present new design, notably the complete absence of any spring or springs, the valve is operable over a wide band of fluid pressures.

One of the additional advantages attained by the use of a differential piston for actuating the valve lies in the fact that a balanced speed cycle, or predetermined speed cycles other than a balanced one, may be provided for by a proper selection of areas for the opposite faces of the differential piston during the design of the valve.

The present improved construction lends itself readily to employment with a solenoid-actuated pilot valve, and certain novel features of the invention are directed to solenoid-triggered valves of this kind. Other features of the invention, however, are applicable to four-way valves whose actuation may be controlled in other ways.

One manner of achieving the foregoing general objectives and advantages, and such other objects and advantages as may hereinafter appear or be pointed out, is shown by way of example in the accompanying drawings, in which:

Figure 1 is a plan view of a four-way valve constructed in accordance with the present invention;

Figure 2 is an elevational view;

Figure 3 is an end view;

Figure 4 is an enlarged cross-sectional view taken substantially along the line 4—4 of Figure 1;

Figure 5 is a cross-sectional view taken substantially along the line 5—5 of Figure 4;

Figure 6 is a fragmentary cross-sectional view showing the same parts as at the left end of Figure 4 but in different positional relationships;

Figure 7:
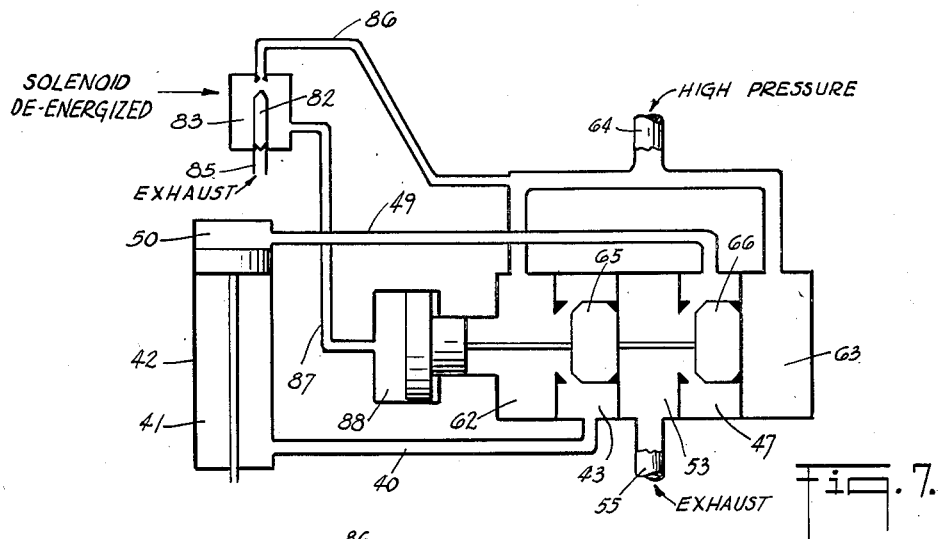
Figure 7 and 8 are diagrammatic views illustrating the general mode of functioning of the present valve and pilot arrangement.

An elongated valve body 20 is provided with suitable lugs 21 to facilitate the mounting of the valve at or near its point of use. The valve body may be composed of cast bronze or the like. It is provided with a longitudinal hollow which is sealed at one end by the closure cap 22 and at the other end by the closure element 23. The cap 22 has a central bored recess 24 on the inside to serve as a bearing for the end of a valve stem 25.

Mounted within the longitudinal hollow of the valve body is a positionally fixed assembly of parts which defines two sets of poppet-type valve seats in a spaced tandem arrangement. The valve seat 26 is formed on the end of a ring element 27 which abuts against the shoulder 28 of the valve body, and an O-ring or its equivalent maintains a fluid-tight fit.

The valve seat 26 faces to the left, as viewed in Figure 4. An oppositely facing valve seat 29 (best seen in Figures 11–13) is formed on the end of a ring element 30 which is maintained at a fixed distance from the element 27 by a sleeve 31. The ring element 30 is of greater length than the element 27 and is provided at its opposite end with another valve seat 32, facing in the same direction as the seat 26. Opposite the seat 32, and kept at a fixed distance from it by the sleeve 33, is the fourth valve seat 34 which is formed on the end of a ring element 35. (As in the case of seat 29, the seat 34 can be seen most clearly in Figures 11–13.)

The ring element 35 is similar in construction to the ring element 27, and has an O-ring or its equivalent on its periphery to establish a fluid-tight fit. Similar O-rings extend around the medial ring element 30.

The parts 27, 31, 30, 33 and 35 are held in place by the ferrule 36 which is screwed into association with the valve body and presses the parts against the shoulder 28. In the illustrated construction the ferrule 36 is split as shown in Figure 4, and the split segments are connected by a locking screw 37 which fulfills a function similar to that of a lock-nut, i. e., to hold the screw threads on the ferrule and valve body in frictional interengagement.

All of these interior working parts are preferably composed of stainless steel or the like, especially the valve seats and the valve elements hereinafter to be described.

Figure 8:
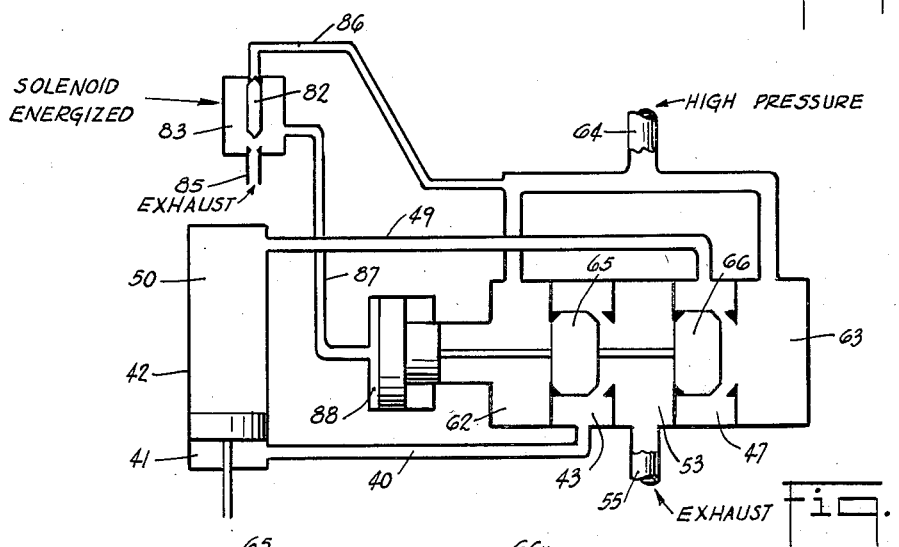

In the region of the sleeve 33 the valve body is provided with an annular recess 38 which communicates with the threaded opening 39 (Figures 2 and 5). Pipe connection is made at this opening to establish communication with one of the chambers into which and from which fluid is to be alternately introduced and withdrawn. For example, as indicated in Figures 7 and 8, a pipe or conduit 40 can be made to connect with the chamber 41 at one end of a hydraulic or pneumatic cylinder 42.

The space 38 is in constant communication with the space 43 between the pair of valve seats 32 and 34 since the sleeve 33 is provided with circumferentially spaced openings 44 (Figure 5).

In the region of the sleeve 31 the valve body is provided with another annular recess 45. As a result of the openings 46 in the sleeve 31 (Figure 5) the recess 45 is in constant communication with the space 47 between the pair of valve seats 26 and 29. The recess 45 communicates with the threaded opening 48 (Figures 2 and 5) by means of which a pipe connection 49 (Figures 7 and 8) can be made to the space or chamber 50 at the opposite end of the cylinder 42.

In the region between the annular recesses 38 and 45 the valve body is provided with still another annular recess 51. As a result of openings 52 (Figure 5) in the ring element 30 the recess 51 is in constant communication with the space 53 between the two pairs of valve seats. The recess 51 communicates with a threaded opening 54 (Figures 1 and 4) which leads to the exhaust end of the fluid operating system. For example, if the operating fluid is air, a simple exhaust pipe 55 (Figures 7 and 8) is all that is needed. If the operating fluid is a liquid, and if the system is a closed one, the pipe 55 would establish a permanent communication with the low-pressure side of the system in well-known fashion.

The high-pressure side of the system may be connected to the valve at the threaded opening 56 (Figure 5) which is formed in a rear wall or plate 57. For reasons of manufacturing expedience, and also to permit replacement for purposes hereinafter to be explained, the wall 57 is removably secured to the valve body as indicated at 58. Beneath the wall 57 the valve body is shaped to define a longitudinal recess 59 with which the opening 56 communicates. From this recess, openings 60 and 61 in the valve body lead respectively to the opposite end regions 62 and 63 of the valve body. A pipe connection to the opening 56, indicated at 64 in Figures 7 and 8, serves to establish a permanent communication between a suitable source of high-pressure fluid (not shown) and the spaces 62 and 63 within the valve body.

Figure 9:
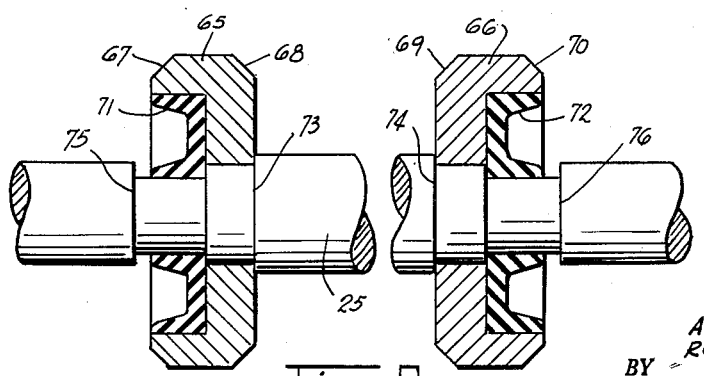
Figure 9 is an enlarged longitudinal cross-sectional view showing some of the details of the mounting of the valve elements on the valve stem.

Mounted on the valve stem 25 are two valve elements 65 and 66, one of them arranged on the valve stem between the set of valve seats 32 and 34, the other positioned between the set of valve seats 26 and 29. These valve elements, and the manner in which they are mounted on the valve stem, are shown most clearly in Figure 9.

The element 65 is machined to define a poppet-type valve surface 67 on one side and a similar valve surface 68 on the other. The surface 67 seats and unseats on the valve seat 34 as the stem 25 reciprocates, and the surface 68 cooperates with the valve seat 32. Similarly, the valve element 66 has a valve surface 69 to seat on the valve seat 29 and a valve surface 70 to cooperate with the valve seat 26.

Each of the valve elements has a depression in one of its sides to receive a resilient U-ring. As viewed in Figure 9, the U-ring 71 faces toward the left and fits snugly within the valve element 65, while the corresponding U-ring 72 engages with the valve element 66 and faces toward the right. This association of parts provides for a limited movability of each valve element longitudinally along the valve stem, yet maintains a fluid-tight fit between the valve element and the valve stem.

The valve elements ride on valve stem sections of reduced diameter. Each of these reduced sections is slightly greater in axial length than the over-all thickness of the valve element, and it is this fact which permits each valve element to shift freely on the valve stem through a limited extent. It is to be noted that this special arrangement of the parts defines valve stem shoulders 73 and 74 which face away from each other and serve as abutments which limit the relative movements of the valve elements toward each other. Similarly, the shoulders or abutments 75 and 76, facing toward each other, limit the extent of movement of the valve elements in the opposite directions, i. e., outwardly.

Of importance is the fact that the abutment shoulders 73 and 74 are so spaced that when the valve elements 65 and 66 are in their closest relation (as in Figures 9, 11, 12 and 13) the center-to-center distance between them is less than that between the two sets of valve seats. Moreover, the inwardly facing shoulders 75 and 76 are so spaced from each other that the valve elements in their furthest apart relation are separated by a distance, measured center-to-center, which is greater than the axial distance, similarly measured, between the two sets of valve seats. The significance of these dimensional relations, so far as the operation and advantageous functioning of the valve are concerned, will be apparent from Figures 10-14.

Figure 10:
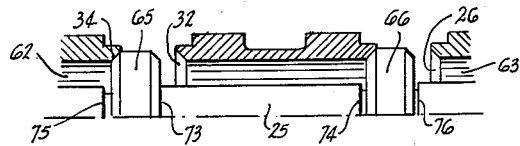
Figure 10–14 are diagrammatic views illustrating the details of the valve action during one stroke of the valve stem.

In Figure 10, the valve elements are in the positions they assume when the valve stem is at the end of its stroke toward the left. Both valve elements are firmly seated, the element 65 against the valve seat 34 and the element 66 against the valve seat 29. However, while it is the shoulder 73 that presses the element 65 against the seat 34, it is the high-pressure fluid in the space 63, and not the shoulder 76, which presses the valve element 66 against the valve seat 29. This independent seating of the valve element 66 results from the ability of the valve element 66 to move toward the other valve element 65, and this in turn results from the arrangement of the shoulders 73 and 74 in the spaced relation shown whereby a gap or clearance exists between the shoulder 74 and the valve element 66.

Figure 11:
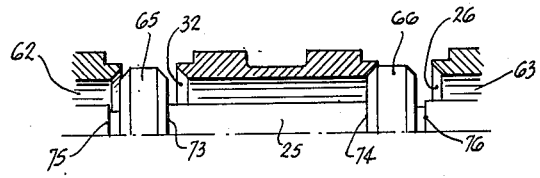
Figure 12:
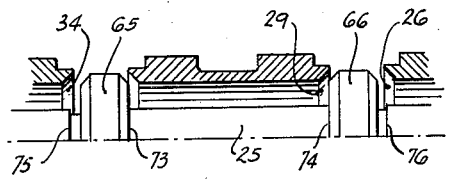
Figure 13:
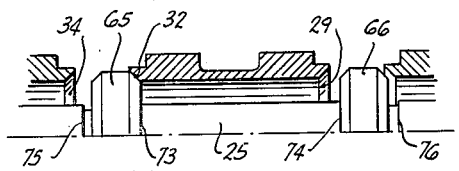
Figure 14:
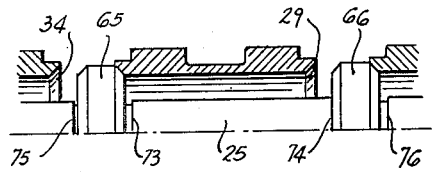

When the valve stem 25 starts moving toward the right, the pressure of the fluid in the space 62 keeps the valve element against the shoulder 73 while the shoulder 74 approaches and establishes contact with the valve element 66 (Figure 11). Continued movement of the valve stem toward the right causes the shoulder 74 to press against the valve element 66 and unseat it from the valve seat 29 (Figure 12). Presently the valve element 65 seats itself against the valve seat 32 (Figure 13), but because of the shiftability of the valve element 65 on the valve stem 25 the latter is allowed to continue its movement until the valve element is firmly seated against the valve seat 26 (Figure 14). In the meantime the valve element 65 remains seated against the valve seat 32 as a result of the high-pressure fluid in the space 62.

Figure 14 is similar to Figure 10 in that it shows the valve elements as they are seated when the valve stem is at the end of its right-hand stroke. On the next stroke to the left, the procedure is reversed. First the shoulder 73 approaches and makes contact with the valve element 65, while the valve element 66 is kept in contact with the shoulder 74 by the fluid pressure in the space 63 (Figure 13). Then the shoulder 73 unseats the element 65 from the valve seat 32 (Figure 12). Then the valve element 66 seats against the valve seat 29 (Figure 11) while the valve stem continues to the left and finally seats the valve element 65 against the seat 34 (Figure 10).

It will thus be seen that the valves seat themselves independently during each stroke of the valve stem, and that this result is achieved without the use of springs and without calling for any manufacturing precision beyond normal commercial tolerances. Moreover, the operation compensates automatically for slight inaccuracies resulting either from manufacture or from wear, and for dimensional variations resulting from temperature changes. And if the bore in each valve element is made just large enough so as not to fit too tightly on the valve stem, the yieldability and resilience of the U-rings provides additional self-compensation for minor inaccuracies in alignment of valve seats or valve stem. These advantages are attained without recourse to yieldability in valve seats or valve surfaces, hence all the benefits of metal-to-metal poppet-valve action are present, including resistance to wear, tight and reliable seating, relative simplicity of manufacture, and fast action with a short stroke. A four-way valve of the kind illustrated is capable of operating as fast as 400 cycles (double-strokes) per minute.

The differential piston which actuates the valve stem is shown in Figures 4-6. The longitudinal hollow in the valve body 20 is machined to define a cylinder 77 of relatively small diameter surrounding the space 62 and a cylinder 78 of relatively large diameter in the region to the left (as viewed in these figures). Mounted on the end of the valve stem 25 is a piston having one part 79 operable in the cylinder 77 and a larger part 80 operable in the cylinder 78. U-rings or their equivalent may be employed, as shown, to establish the desired degree of slidability and fluid-tightness.

The operation of this piston is controlled and monitored by a solenoid pilot valve of well-known character per se. Such a valve is shown at 81. The core 82 has valve discs at its opposite ends and reciprocates between the positions shown in Figures 4 and 6 when the solenoid is energized and de-energized. The core is rather loosely fitted within the chamber 83, as is usual. In Figure 4 the solenoid is energized and the core 82 is being held in a position that closes the valve port 84 and uncovers the valve port 85. The port 84 is in constant communication, via pipe 86, with the space 62 in which there is high-pressure fluid. The port 85 is an exhaust and leads either to the atmosphere (if the system is pneumatic) or to the low-pressure side of the system (if it is hydraulic). There is also a passage 87 leading from the chamber 83 to the space 88 at the left of the piston 80.

In the position of the solenoid core 82 shown in Figure 4, the space 88 is in communication with the exhaust port 85, hence the pressure of fluid on the piston 79 presses the parts to the left (see also Figures 8 and 10). When the solenoid is de-energized the core 82 shifts to the position shown in Figure 6, in which the exhaust port 85 is closed and in which communication has been established, through chamber 83, between the port 84 and the passage 87. This brings high-pressure fluid to the space 88 at the left of piston 80, and since this piston is larger than the piston 79 the differential pressure urges the composite piston to the right. This position is shown not only in Figure 6 but also in Figure 7 and 14.

The over-all operation of the installation is best shown in Figures 7 and 8. Energizing and de-energizing of the solenoid connects the space 88 alternately to high-pressure fluid and exhaust, thus bringing about reciprocation of the valve stem. This shifts the valve elements between the positions shown in Figures 7 and 8 and establishes the desired alternating fluid connections to the chambers or cylinders 41 and 50.

Since there is always fluid under pressure acting on the outer surfaces of the valve elements 65 and 66, the valve is "balanced," and the actuating force need never be substantially greater than that which is needed to overcome friction and the weight of the moving parts. Sometimes it is desirable to employ different pressures in the end spaces 62 and 63. This may be the case where it is desired to supply one fluid pressure to one cylinder (e. g., the cylinder 41) and a different fluid pressure to the other cylinder (e. g., the cylinder 50). But even in such a case, the balance of the valve as a whole is not materially disturbed.

Figure 15:
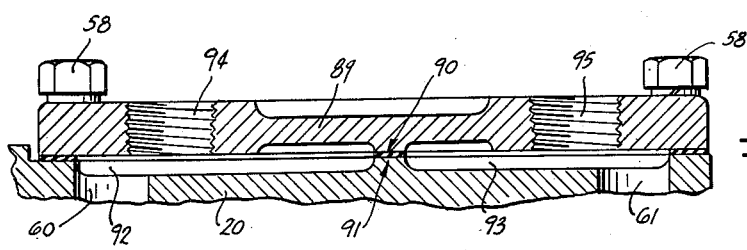
Figures 15 and 16 are fragmentary cross-sectional views similar to the upper part of Figure 5, illustrating two modifications.

In order to accomplish the delivery of different fluid pressures, as mentioned in the preceding paragraph, the plate or wall 57 may be replaced by the one shown in Figure 15. The wall 89 has a partition 90 which cooperates with a corresponding part 91 on the valve body 20 to establish a barrier between the chambers 92 and 93. The chamber 92 communicates through opening 60 with the space 62 at one end of the valve, and the chamber 93 communicates through opening 61 with the space 63 at the other end of the valve. The high-pressure inlet opening 94 corresponds to the opening 56 (Figure 5), and the element 89 is specially provided with a second inlet opening 95, leading to the chamber 93, through which the second desired pressure fluid is introduced.

Figure 16:
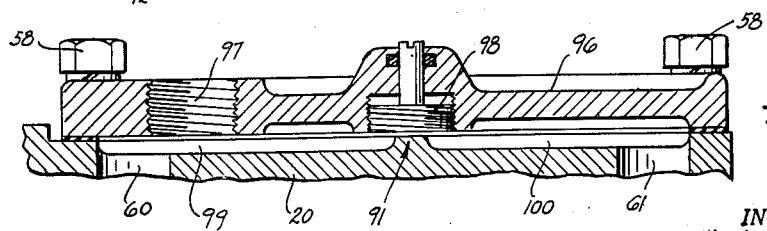

As an alternative the special wall 96 may be employed (Figure 16). This wall is like wall 57 in that it has only a single high-pressure inlet opening 97. At the center it has an adjustable plug 98 whose adjustment (as by screw-threads as shown) will move the face of the plug toward and away from the rib or partition 91. The high-pressure fluid entering the chamber 99 can thus be throttled down to any desired degree as it passes into the chamber 100.

A valve of the present improved character can be of any desired size and capacity. For example, it might be made small enough for ¼-inch pipe connections, or it might be large enough to handle fluids passing through 3½-inch pipe, or even larger. Dimensions of parts will vary widely, depending upon size and purpose of installation. In the case of a small valve, the valve seats might be no longer than a fraction of an inch in diameter; in larger valves they might be several inches in diameter. The stroke in each case would be in proportion, adequate to allow passage through each valve, when open, of the fluid being handled.

The pressures used could also vary widely. It is contemplated that a pneumatic pressure as low as 10 pounds per square inch would be used in certain cases, whereas other installations would employ hydraulic pressures of 5000 pounds or greater. In any case, since the actuation of the valve is accomplished by a differential piston, a selected valve is useful for a wide range of pressures and is not limited (as in the case of a spring-pressed valve) to pressures within a restricted range. Also, by simply designing the differential piston with one face twice the area of the other, a balanced time cycle can be provided for regardless of the pressure of the fluid with which the valve will be used. Similarly, if desired, any other time cycle, other than a balanced one, can be provided for in the initial design of the valve.

It will be understood that many of the details herein illustrated and described are merely by way of example, and that such details may be varied in a number of respects, in practice, without necessarily departing from the spirit and scope of the invention as expressed in the appended claims.

Having thus described our invention and illustrated its use what we claim as new and desire to secure by grant of Letters Patent is:

1. In a four-way valve, a valve body provided with two sets of opposed poppet-valve seats arranged in tandem, a valve element for each set of seats and constructed to define oppositely facing poppet valves, a common valve stem mounted in the valve body for axial reciprocation, and means for mounting the valve elements on the valve stem to allow for a limited relative movement of said valve elements toward and away from each other independent of valve stem movements, said relative movability of the valve elements allowing independent seating of the valves during a single stroke of the valve stem, said valve stem being provided with abutments limiting the movement of the valve elements toward each other, the distance center-to-center between the valve elements in their closest relation being less than that between said two sets of valve seats.

2. In a four-way valve, a valve body provided with two sets of opposed poppet-valve seats arranged in tandem, a valve element for each set of seats and constructed to define oppositely facing poppet valves, a common valve stem mounted in the valve body for axial reciprocation, and means for mounting the valve elements on the valve stem to allow for a limited relative movement of said valve elements toward and away from each other independent of valve stem movements, said relative movability of the valve elements allowing independent seating of the valves during a single stroke of the valve stem, said valve stem being provided with abutments limiting the movement of the valve elements toward each other and other abutments limiting the movement of the valve elements away from each other, the distance center-to-center between said two sets of valve seats being greater than that between the valve elements in their closest relation and less than that between the valve elements in their furthest separation.

3. In a four-way valve, a valve body provided with two sets of opposed poppet-valve seats arranged in tandem, a valve element for each set of seats and constructed to define oppositely facing poppet valves, a common valve stem mounted in the valve body for axial reciprocation, and means for mounting the valve elements on the valve stem to allow for a limited relative movement of said valve elements toward and away from each other independent of valve stem movement, said relative movability of the valve elements allowing independent seating of the valves during a single stroke of the valve stem, said valve-mounting means including abutment shoulders formed on the valve stem and facing away from each other, said valve elements having parts which encounter said shoulders when the valve elements move toward each other, said shoulders being so spaced from each other that when the valve elements are in their closest relation the center-to-center distance between them is less than that between said two sets of valve seats.

4. In a four-way valve, a valve body provided with two sets of opposed poppet-valve seats arranged in tandem, a valve element for each set of seats and constructed to define oppositely facing poppet valves, a common valve stem mounted in the valve body for axial reciprocation, and means for mounting the valve elements on the valve stem to allow for a limited relative movement of said valve elements toward and away from each other independent of valve stem movement, said relative movability of the valve elements allowing independent seating of the valves during a single stroke of the valve stem, said valve-mounting means including a pair of abutment shoulders for each valve element, one of each pair of said shoulders facing out and limiting the movement of one valve element toward the other, the other of each pair of said shoulders facing in and limiting the movement of said one valve element away from said other, the outwardly facing shoulders being so spaced from each other that when the valve elements are in their closest relation the center-to-center distance between them is less than that between said two sets of valve seats, the inwardly facing shoulders being so spaced from each other that when the valve elements are in their furthest apart relation the center-to-center distance between them is greater than that between said two sets of valve seats.

ALAN W. CHURCHILL.
ROSCOE C. VAN CAMP.

REFERENCES CITED

The following references are of record in the file of this patent:

UNITED STATES PATENTS

| Number | Name | Date |
|---|---|---|
| 358,775 | Graves | Mar. 1, 1887 |
| 1,679,614 | Lichtenberg | Aug. 7, 1928 |
| 1,679,762 | Bragg | Aug. 7, 1928 |
| 1,921,092 | Newton | Aug. 8, 1933 |

FOREIGN PATENTS

| Number | Country | Date |
|---|---|---|
| 586,501 | Great Britain | of 1947 |